3,473,917
BASIC STEELMAKING PROCESS
Eduard Michaelis, Seewalchen (Attersee), Austria, assignor to Bot Brassert Oxygen Technik AG, Zurich, Switzerland, a company of Switzerland
No Drawing. Filed Aug. 10, 1967, Ser. No. 659,590
Claims priority, application Austria, Aug. 25, 1966,
A 8,056/66
Int. Cl. C21c 5/28
U.S. Cl. 75—52    2 Claims

ABSTRACT OF THE DISCLOSURE

A method for increasing, in a basic steelmaking process and particularly in a process for refining pig iron by top-blowing oxygen in the presence of basic slag-forming materials, the amount of solid charging materials that can be incorporated in the charge by adding $CaC_2$ in the form of the molecular compound $CaC_2$—$CaC_2.CaO$ which has lower melting and softening temperatures than those of commercial calcium carbide and calcium oxide, thereby causing the carbide to be more readily decomposed and the required additional heat thus liberated at an earlier moment.

---

The invention relates to a basic steelmaking process, in particular to a process for refining pig iron by top-blowing oxygen in the presence of basic slag-forming materials.

The object of the invention is to increase the amount of solid charging materials, such as scrap and/or ore, in a charge by supplying additional heat to the charge. To achieve this object, various proposals have already been made, such as adding solid heat carriers, e.g. electrode carbon or ferrosilicium, to the bath; supplying liquid, solid or gaseous fuels along with the oxygen jet; heating the bath with special burners; separately preheating the solid charging materials; over-heating part of a previous charge and combining it with the charging materials of a subsequent charge; and the like.

According to an unpublished proposal, calcium carbide is added as a solid heat carrier at the beginning of the refining process in order to utilize the exothermic heat liberated during carbide decomposition. During carbide decomposition under the influence of the oxidizing refining atmosphere, CaO as well as CO and $CO_2$, respectively, are formed. A considerable amount of heat is liberated in that process, corresponding mainly to the carbide decomposition heat and also in part to the carbon combustion heat. The accumulating CaO is used up for slag formation whereby part of the otherwise necessary CaO is saved. It was found that in a converter process the scrap quota can be increased to twice the amount or even more, i.e. from the usual percentage of approximately 20%, to 40% and more, when adding calcium carbide as a solid heat carrier.

The present invention has as its object to improve that proposal and comprises adding calcium carbide substantially in the form of the molecular compound $CaC_2$—$CaC_2.CaO$ or in the form of a mixture of $CaC_2$ and CaO corresponding to the composition of the said molecular compound.

According to the invention, the molecular compound $CaC_2$—$CaC_2.CaO$ or the corresponding mixture of $CaC_2$ and CaO is added at the beginning of the process. The substances can be added together with the scrap, they can also be added after formation of a charge composed of liquid pig iron and the scrap to be melted down and after the beginning of the oxygen supply (ignition). The above-mentioned substances should preferably be added before the end of the 5th blowing minute.

By using a particular molecular compound of calcium carbide and calcium oxide according to the invention, a substantial advantage is achieved: While commercial calcium carbide and commercial calcium oxide have melting points higher than 2000° C., namely $CaC_2$ at approximately 2300° C. and CaO at approximately 2500° C., the molecular compound according to the invention has a melting point lower than 2000° C., namely approximately 1750–1800° C. The softening temperature of the molecular compound proposed by the invention is another 200° C. lower, barely above 1600° C.

While according to a previous proposal carbide decomposition and liberation of heat have set in only at such high temperatures as, during an oxygen converter process, prevail in the hot spot, i.e. in the zone of impingement of the oxygen upon the liquid iron, and special measures were therefore necessary in order to cause the calcium carbide to enter into intimate contact with the hot spot, these difficulties have been surmounted by the invention. Due to the substantially lower softening temperature, carbide decomposition in the process of the invention is caused even beyond the range of the hot spot, on a larger surface, and the desired heat is available at an earlier moment. As a consequence, slag formation will also start earlier and, when using the molecular compound according to the invention, the blowing periods are practically no longer than in a usual refining process.

The molecular compound $CaC_2$—$CaC_2.CaO$ has a theoretical $CaC_2$ content of 69.4% and a theoretical CaO content of 30.6%. It is a eutectic in the $CaC_2$/CaO system. In practice, however, the substances used are not pure, and impurities of up to 10% of the molecular compound can be present. The melting point is still considerably below 2000° C. and the softening temperatures approximately 200° C. lower.

Although, according to the invention, it is preferred to use the pre-formed molecular compound

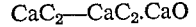

$$CaC_2\text{—}CaC_2.CaO$$

it was found that satisfactory results representing an improvement over the previous technology can also be achieved if, instead of the pre-formed molecular compound, the components $CaC_2$ and CaO are added in the proportion of approximately 70:30 to 65:35. When heating these components, the softening point lies at a temperature range of 1700° C. and below. It is, however, a pre-requirement for this working method that carbide and lime must be pulverized and mixed before introduction. If the materials are pulverized and carefully mixed, it is possible to get the same eutectic melting or softening temperature as with the preformed molecular compound. If the $CaC_2$/CaO mixture is added in pulverized and pre-mixed form, known lime dust blowing lances carrying the powder mixture suspended in oxygen or in a carrier gas, can be used.

What I claim is:

1. In a process for refining a ferrous charge composed of liquid and solid charging materials by top-blowing oxygen onto said charge in the presence of basic slag-forming materials, comprising adding calcium carbide at the beginning of the process in order to supply additional heat to said charge for the purpose of increasing the admissible proportion of solid charging materials, the step of adding said calcium carbide substantially in the form of the molecular compound $CaC_2$—$CaC_2.CaO$.

2. The process set forth in claim 1 wherein a mixture of $CaC_2$ and $CaO$ corresponding to the composition of said molecular compound is added.

References Cited

UNITED STATES PATENTS

| | | | |
|---|---|---|---|
| 2,992,097 | 7/1961 | Spence | 75—55 |
| 3,309,194 | 3/1967 | Dunn | 75—52 |
| 3,376,130 | 4/1968 | Kootz et al. | 75—52 |

RICHARD O. DEAN, Primary Examiner

U.S. Cl. X.R.

23—315; 75—55